US008126221B2

(12) United States Patent
Kaplan

(10) Patent No.: US 8,126,221 B2
(45) Date of Patent: Feb. 28, 2012

(54) INTERACTIVE DEVICE AND METHOD FOR TRANSMITTING COMMANDS FROM A USER

(75) Inventor: Frederic Kaplan, Geneva (CH)

(73) Assignee: Ecole Polytechnique Federale de Lausanne (EPFL), Ecublens (CH)

( * ) Notice: Subject to any disclaimer, the term of this patent is extended or adjusted under 35 U.S.C. 154(b) by 1050 days.

(21) Appl. No.: 12/031,433

(22) Filed: Feb. 14, 2008

(65) Prior Publication Data

US 2009/0208052 A1 Aug. 20, 2009

(51) Int. Cl.
*G06K 9/00* (2006.01)
(52) U.S. Cl. .................. 382/118; 382/103; 382/203
(58) Field of Classification Search .............. 382/103, 382/118, 203, 154, 189, 276
See application file for complete search history.

(56) References Cited

U.S. PATENT DOCUMENTS

| 5,802,220 A | 9/1998 | Black et al. |
|---|---|---|
| 6,363,160 B1 | 3/2002 | Bradski et al. |
| 6,504,942 B1 * | 1/2003 | Hong et al. ............... 382/103 |
| 6,633,655 B1 * | 10/2003 | Hong et al. ............... 382/118 |
| 7,127,100 B2 * | 10/2006 | Wenzel et al. ............. 382/154 |

(Continued)

FOREIGN PATENT DOCUMENTS

DE 10313019 10/2004

OTHER PUBLICATIONS

European Search Report, Application No. EP09151976, Filing Date: Jun. 16, 2009.

*Primary Examiner* — Wesley Tucker
*Assistant Examiner* — Aklilu Woldemariam
(74) *Attorney, Agent, or Firm* — DLA Piper LLP US

(57) ABSTRACT

According to the present invention, it is provided an interactive device comprising a display, a camera, an image analyzing means, said interactive device comprising means to acquire an image with the camera, the analyzing means detecting at least a human face on the acquired image and displaying on the display at least a pattern where the human face was detected wherein the interactive device further comprises means to determine a halo region extending at least around the pattern and means to add into the halo region at least one interactive zone related to a command, means to detect movement onto the interactive zone and means to execute the command by said device.

19 Claims, 2 Drawing Sheets

U.S. PATENT DOCUMENTS

| | | |
|---|---|---|
| 7,764,828 B2 * | 7/2010 | Sasaki et al. .................. 382/154 |
| 7,916,971 B2 * | 3/2011 | Bigioi et al. .................. 382/275 |
| 2003/0031357 A1 * | 2/2003 | Wenzel et al. ................ 382/154 |
| 2005/0271279 A1 | 12/2005 | Fujimura et al. |
| 2006/0045381 A1 * | 3/2006 | Matsuo et al. ................ 382/276 |
| 2006/0188144 A1 * | 8/2006 | Sasaki et al. .................. 382/154 |
| 2007/0154095 A1 * | 7/2007 | Cao et al. ..................... 382/190 |
| 2007/0201750 A1 * | 8/2007 | Ito et al. ........................ 382/228 |

* cited by examiner

INTERACTIVE DEVICE AND METHOD FOR TRANSMITTING COMMANDS FROM A USER

The basic interaction principles introduced during the personal computer revolution in the 1980's (mouse, menus, desktop metaphor) are still used in most computers today. Compared to previously commonly used textual interfaces, the set of innovations introduced with the graphical user interface took advantage of a widen range of human skills and abilities, including direct sensorimotor manipulation, visual metaphors, pattern recognition, spatial reasoning and peripheral attention, appealing to a large less-technical oriented audience.

Personal computers were designed to be efficiently used by an individual user (hence their name) in a sitting position, either working or playing, fully concentrated on the task at hand. As the scope of applications and domains of computer usage has widened, personal computers have started to be used in situations where continuous full attention to the device is likely to an obstacle to other forms of social interactions. In addition personal computer tend now to be used in casual settings were the sitting position is actually unnatural. To play music in a party, to serve as an aid in the kitchen, to interact with visitors in a museum or to give advice to customers in shops, interaction systems of classical personal computers are clearly ill-adapted.

The present invention is a novel kind of computer interface permitting easy multi-user contact-free interactions in various contexts of use. The interaction system does not make use of classical input tools like keyboard, mouse or remote control, but features instead a gesture-based augmented reality interaction environment, in the conjunction with the optional use of convivial everyday objects like books, cards and other small objects.

BRIEF DESCRIPTION OF THE INVENTION

According to the present invention, it is provided an interactive device comprising a display, a camera, an image analysing means, said interactive device comprising means to acquire an image with the camera, the analysing means detecting at least a human face on the acquired image and displaying on the display at least a pattern where the human face was detected wherein the interactive device further comprises means to determine a halo region extending at least around the pattern and means to add into the halo region at least one interactive zone related to a command, means to detect movement onto the interactive zone and means to execute the command by said device.

In the same manner, the present invention also covers a man-machine interface method executed by an interactive device, comprising a display, a camera, an image analysing means, this method executing the following steps
  capturing a first image by the camera,
  analysing said image with the analysing means to detect at least an human face,
  determining a halo region extending at least around the human face,
  displaying on the display at least a pattern where the human face was detected,
  adding into the halo region at least one interactive zone serving to transmit command to the device,
  detecting movement onto the interactive zone and,
  executing the command by the device.
The main feature of the invention is to locate the visual elements in an area near the detected user. As soon as a human face is detected, the visual elements are placed around the visual representation (pattern) of the human face so that the movements by the user to interact with the device are smooth and natural.

BRIEF DESCRIPTION OF THE FIGURES

The present invention will be better understood thanks to the attached figures in which:
  the FIG. 1a to 1e are simulations of the position of the halo region is various examples
  the FIG. 2 illustrates a bloc diagram corresponding to a possible implementation of the interaction system using different software modules.

DETAILED DESCRIPTION

Basic Principles of the "Halo" Interaction System

In classical graphical user interfaces the user typically moves a cursor, using for instance a mouse, inside a graphical environment, for instance figuring metaphorically a desktop. His actions take place in this graphical virtual environment and not in the real one. This explains why one has to be fully concentrated while operating with a personal computer.

Figure 1:
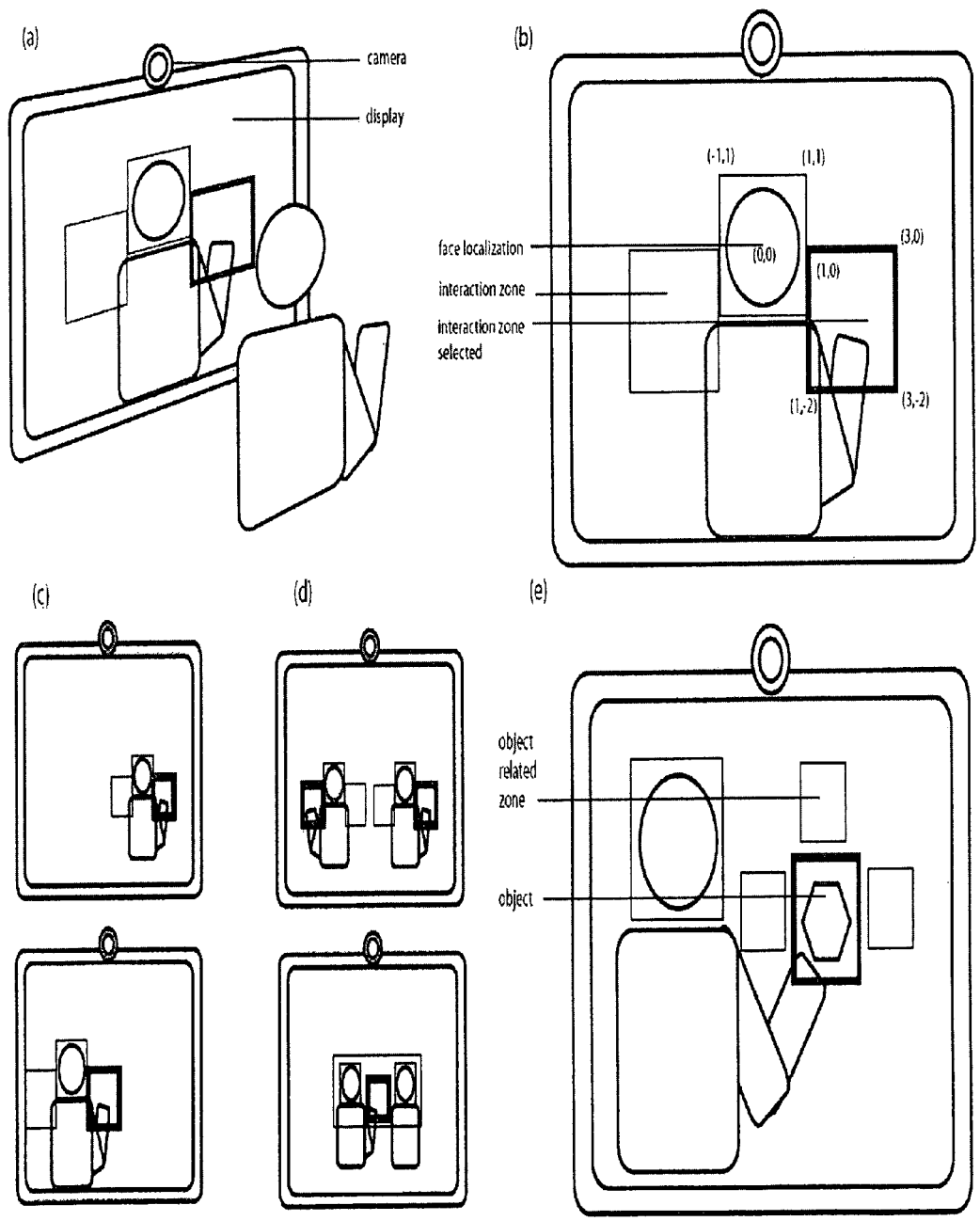

(AUGMENTED MIRROR) In the "halo" interaction system, the user sees an image of himself on a camera mounted display. It can either be directly the picture taken by the camera of just a silhouette or a pattern aiming at locating to user on the displayed image. In any case, the user identifies very easily with the representation of himself which moves exactly the way he does. In some way, the system can be understood as an augmented mirror (FIG. 1a).

(ACTIVATION OF INTERACTIVE ZONES) Interactive zones or visual elements can be represented on the screen. Each zone is associated with an activity level. When the user moves parts of his body in one of these zones, the zone's activity increases. When no activity occurs in the zone, the zone's activity decreases. When the zone's activity reaches a certain level of activation the zone is "selected". This is the equivalent of clicking on a button with a mouse (FIG. 1a).

(MAIN INNOVATION IS AUTOMATIC POSITIONING OF THE INTERACTIVE ZONES) This technique was already used as an efficient interaction method in several systems, notably in the context of games. The key innovation introduced by the "halo" interactive system lies on an adaptive method for automatically positioning the "interactive zones". Instead of being defined as fixed zones on the display they are defined as fixed zones in the space of the user. In other words, the zones are defined in relation to the user's location as perceived by the mounted camera.

(NOTION OF USER-CENTRED INTERFACE) The presence and location of the user can be extracted in various ways. A simple and efficient method consists in extracting the face of the user in the image grabbed by the camera. This gives a good estimate of his position and size which can in turn be converted in (x,y,z) coordinates. Based on the information it is possible to display the interactive zone "around" the user, like a "halo". When the user gets closer to the camera mounted display the interactive zones get bigger on the display, when he moves back they get smaller on the display (FIG. 1c). The ratio between the size of the human face and the halo region is mainly constant. When he moves left or right they follow him likewise. However, in the user's own space the interactive zone are always at the same position, like always-ready tools. Thus, the "halo" interface system is user-centric in a strong sense: it is centered around the user. This also means that interaction zones only appear when the user is in sight and that they disappear as soon as the user leaves. The main advantage of the adaptive halo region is to keep a constant user behaviour while entering commands to the interactive device. When the user appears small on the display, i.e. the user is relatively far from the camera, the halo region is also small around the user and the interactive regions located close to the user. As the consequence, when the user raise the arm to reach one interactive region, he made the same movement as he will be closer to the camera.

(TYPE OF DIALOG BOXES AND CONTROLLERS THAT CAN BE IMPLEMENTED) It is easy to define a large number of interfaces using such a system of user-centered interactive zones, including the classical interaction metaphors and dialog boxes introduced with the graphical user interface: menus, multiple choices selection, radio-button, list browsing, potentiometer, etc. For instance, the user can select between two options by waving his hand on one of them. Likewise the user can browse in the list by waving his hand on either a "+" and "−" button, which in returns permits to display different elements on a larger list. This kind of interface can implement "potentiometer" like the ones used for controlling volume or other continuous variables. The user has just to wave his hand on the right or the left (or up or down) of the controller to make it go right or left (or up or down) (this means that invisible interaction zones corresponding to these positions should be defined). An equivalent of "drag and drop" can also be adapted to this interface, the user can wave his hand to select an object and move it to another place and release it by waving his hand again.

(INDIVIDUAL, OBJECT-BASED AND COLLECTIVE HALOS) The interface adapts to the objects and persons present in the field of view of the camera. We can for instance considered the three following situations Only one person is visible: A halo appears around the person proposing different interaction zones adapted to the current application. For instance get weather forecast, consult the current profile of the user, leave a message, etc.

Two persons are visible. In such case the two persons can each have a personal halo or alternatively a halo appears around the two persons with options linked with collective action. It can for instance, ask the users to specify their relationship: friends, coworkers. etc. (FIG. 1d)

One person and one object are visible. A halo appears around the object proposing some actions that the user can do with this object. For instance, if the sleeve of a music CD is presented (recognized with fiducial markers or object recognition methods), the system can suggest to play it, to add it to the database, etc (FIG. 1e). For that purpose, the interactive device contains a database of predefined objects and related commands specific to this object.

(CONTEXTUAL POP-UP MENUS/AUGMENTED REALITY) These are just examples on how the halo system adapts to the context. In some sense, the system can be interpreted as a novel form of contextual pop-up menus linked with individual and entities in the physical world. Therefore, it is adapted to many augmented-reality like applications where additional information or graphical animation are presented on top of real objects and persons.

(MEMORY/ARTIFICIAL INTELLIGENCE SYSTEM) Such kind of interface can interestingly be associated with a database/machine learning system permitting to log the user's interactions and to create individual profiles of use. For instance, associated with face recognition algorithm the system can learn to recognize users, store into the database the data related to the user, and therefore adapt the interface depending on the current user. By learning about how it is used, the interface system can optimize the way it interacts with its users. Unused functions can be temporarily disabled and frequently used functions can be made more efficient. For all these steps, classical supervised and unsupervised machine learning techniques based on neural network, Bayesian classifiers, prototype-based classifiers, support vector machines can be used. Methods based on Principal Component Analysis (incremental or not) can be for instance used of face recognition.

(DOMAINS OF RELEVANCE) Such kind of an interface is relevant for any camera-mounted display including for instance laptop computers equipped with camera, large board display equipped with camera, etc. It is especially relevant for systems that have a movement of their own, either mobile devices or robotic systems as the interface guaranties that interactive elements stay centred around the user and do not move with the device itself.

Technical Description

Technical implementation of such kind of interface are based on four technical means:

a) means for localizing the current user or current object of interest. These can include vision based methods, in particular methods related with face localization algorithm, fiducial markers recognition. These method are using the analysis of the captured image. Other classical localization methods such as arrays of infra-red distance sensors, laser-range finder can be used. These latter method are mainly based on the delay time (or interference) between a signal sent by an emitter and the corresponding signal received by a receiver. For face and object localization one classical vision-based technique is the use of filters, extremely efficient to compute, made of several rectangular masks and associated with four parameters (horizontal and vertical scaling and the coordinates of the center). These masks can be used with learning algorithms which select a small number of critical features from a large set. Eventually, a method can be defined to combine a "cascade" of simple classifiers which allows background regions of the image to be quickly discarded, permitting to focus more computation time on more promising object-like regions. In addition to the horizontal and vertical localization, dimensions of the face or the object should also be measured as they will be used to define the interaction zones. For vision-based method, this can be done simply by evaluating the number of the pixels of the localized object or face and in most method this information is provided in any case by the algorithm. For infra-red and laser-based methods this can also be done in various manner based on the exact disposition of the sensor arrays. Any combination of the previous methods can also be envisioned as long as it enables to localize the current user or current object of interest.

b) means for defining interaction zones relative to the current user/current object of attention size and position. Size and position of interaction zones can be defined relative to the size and position of the current user/current object's size and position. For instance if the width of the current user's face is W and his position is X and Y, two interaction zones corresponding roughly to the positions of waving hands near the head can be defined based on two rectangles which summits are ((X−W/2, 0), (X−W/2,0), (X−3W/2, Y−W), (X−W, Y−W)) and ((X+W/2, 0), (X+W/2,0), (X+3W/2, Y−W), (X+W, Y−W)). More generally, zones can be defined as shapes in a coordinated systems centred on (X,Y) with a multiplying factor W/″ in both axis. In such a coordinate system the previously defined rectangles would be defined as ((−1,0) (−3,0) (−3,−2) (−1,−2)) and ((1,0) (3,0) (3,−2) (1,−2)) (FIG. 1b). In this coordinate system centred on the user, interaction zones that do not change over time stay roughly at the same position from the user point of view. However, on the screen they move, get bigger and smaller, relative to the current user's position.

c) means for detecting the current user's movement in these interaction zones. Various methods can be used to detect the user's movement in these interaction zones. The most simple vision based approach is simply to compute the pixel difference between two consecutive images in order to create an image containing only pixels that have moved. The intersection of this image with the interaction zones previously defined will give an approximation of much movement occurred in each particular zones. As this amount of movement is relative to the apparent size of the zone, it should therefore be made relative to its overall surface. Other vision-based methods can be envisioned, based for instance on optical flow techniques, as well as classical methods for movement detection based on infra-red and laser.

d) means for displaying the result of the current user's movement in these interaction zones. Eventually, the result of the current user's movement in the interaction zones can be displayed in various manners. It is relevant to offer the current users an immediate feedback on whether it has started to activate the interaction zone. This can be done by a change of color, transparency, shape, sound or any other visual or audio methods. This choice depends on the application context considered.

Figure 2:
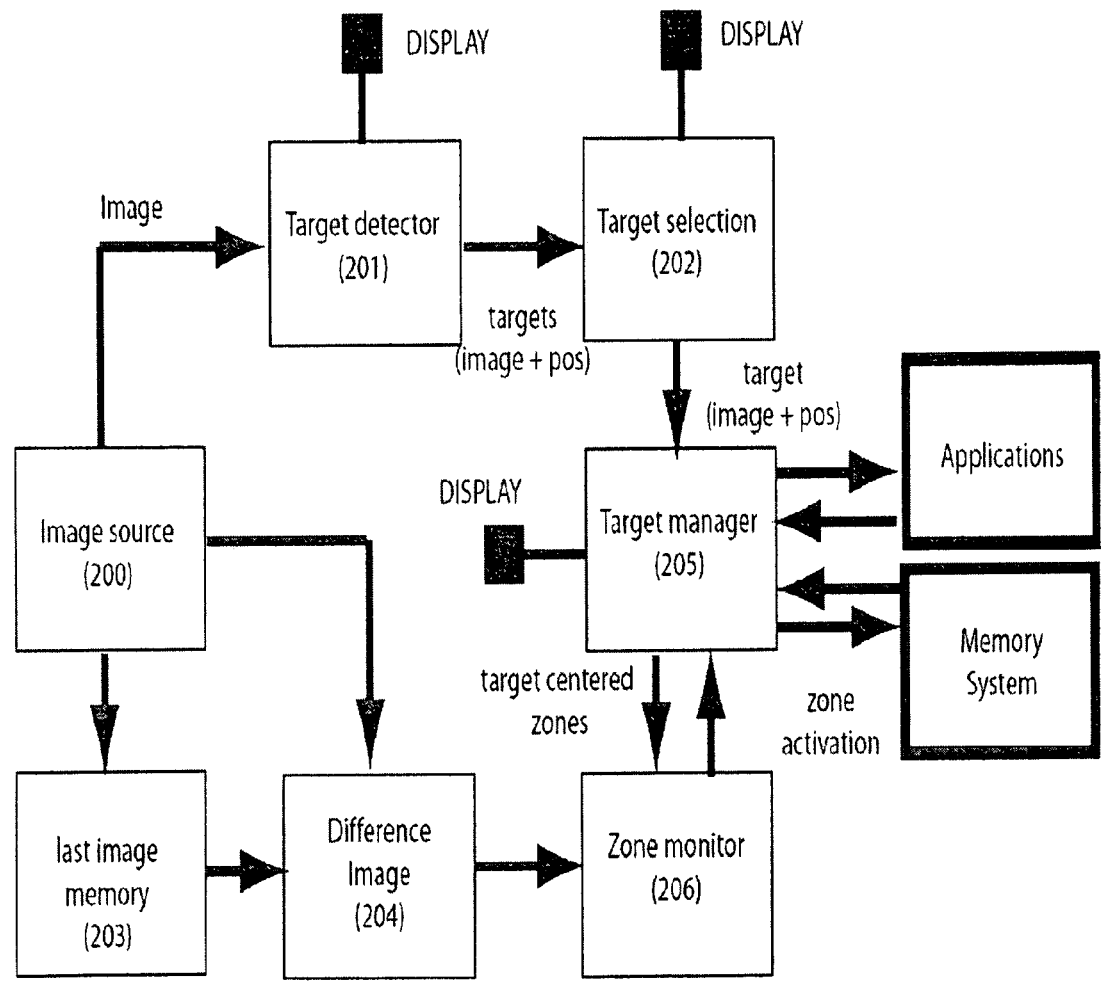

FIG. 2 shows a schematic possible implementation of the "halo" interface organized in various modules. Given an image source (200), one pathway leads to a Target Detector (201) responsible for detecting faces, objects, fiducial markers. As mentioned previously, various state-of-the art techniques can be used. The target information (image parts and positions) are sent to a target selection module (202) responsible for selecting one target among the ones detected in the image. The selected target is then sent to a target manager (205). It will serve as the point of reference for the "halo". Depending on the application context a set of interactive zones are created and managed by the zone monitor (206). In parallel, using the same image source (200), from the last image previously stored in memory (203) a second pathway computes the difference image, resulting in a simple comparison of the two consecutive images. The difference image represents what has moved in the image. This information is sent to the zone monitor (206). For each zone, an activity level is monitored corresponding to integration in time of the number of pixels of the difference image present in the zone. If the activity reaches a threshold level, the zone is activated and this information is passed to the target manager (205). The target manager (205) manages the interaction between the "halo" interactive system and the other software layers, including an optional memory layer responsible for associated identifiers to each target (face and object recognition).

In certain environments, it is not impossible that the halo regions appeared around a non-human face (faces on posters, paintings, objects looking like faces, etc.). A possible solution to avoid such inappropriate detection is to adapt the face localization algorithm to focus primarily on portions of the image that move, thus filtering out all non-moving elements of the environment. In the case of an interactive device which is itself mobile, optical flow based algorithm can be used to distinguish self-movement from movements of other entities present in the environment.

The invention claimed is:

1. A man-machine interface method executed by an interactive device comprising a display, a camera, and an image analyzing means, the method comprising:
   (a) capturing an image with the camera;
   (b) analyzing the image to detect at least one human face;
   (c) determining a measurement parameter associated with the human corresponding to the human face;
   (d) displaying on the display a visual representation of the human face where the human face was detected;
   (e) defining a plurality of interactive zones, each interactive zone being associated with a command to the device, each interactive zone being placed at a distance from the human face based on the measurement parameter and representing a distance accessible by the arm of the human corresponding to the human face;
   (f) detecting an activation movement in one of the plurality of interactive zones;
   (g) executing the command associated with the interactive zone in which the activation movement was detected by the device; and
   (h) iteratively repeating steps (a) though (d) in order to maintain a constant ratio between the human face and the interactive zones in order to allow a constant user behavior while entering commands to the interactive device as a user moves relative to the camera.

2. The man-machine interface method of claim 1, wherein the size of the human face on the captured image is used as the measurement parameter.

3. The man-machine interface method of claim 1, wherein an emitter and a receiver are used to determine a sensed distance of the human face to the camera by measuring a signal delay between the emitter and the receiver, and the sensed distance is used as the measurement parameter.

4. The man-machine interface method of claim 1, wherein the detection of the human face comprises the steps of:
   capturing a plurality of images and selecting the moving portions of the images; and
   analyzing the moving portion to detect the human face.

5. The man-machine interface method of claim 1, further comprising the steps of:
   analyzing the captured image and comparing it with pre-determined objects; and
   in case of positive detection, displaying commands related to this object.

6. The man-machine interface method of claim 1, wherein it comprises the further steps of:
   analyzing the captured image to detect a second human face; and
   in case of positive detection, displaying commands related to interaction between two users.

7. The man-machine interface method of claim 1, wherein the interactive device comprises a database with stored faces related with particular users, this method comprising the further steps of:
   analyzing the detected human face to recognize a stored face; and
   in case of positive recognition, displaying commands related a particular user associated with the stored face.

8. The man-machine interface method of claim 7, wherein it comprises the further steps of:
   recording selections of the particular user to create a selection history; and proposing commands according to previously recorded selections of the particular user.

9. The man-machine interface method of claim 7, wherein the database with stored faces is built incrementally as new users interact with the device.

10. An interactive device comprising a display, a camera, and a processor, said processor being configured to perform the steps of:
   (a) acquiring an image with the camera;
   (b) detecting at least one human face on the acquired image;
   (c) determining a measurement parameter associated with the human corresponding to the human face;
   (d) displaying on the display a visual representation of the human face where the human face was detected;
   (e) defining a plurality of interactive zones, each interactive zone being associated with a command to the device, each interactive zone being placed at a distance from the human face based on the measurement parameter and representing a distance accessible by the arm of the human corresponding the human face;
   (f) detecting an activation movement in one of the plurality of interactive zones;
   (g) executing the command associated with the interactive zone in which the activation movement was detected by the device; and
   (h) iteratively repeating steps and means (a) though (e) in order to maintain a constant ratio between the human face and the interactive zones in order to allow a constant user behavior while entering commands to the interactive device as a user moves relative to the camera.

11. The interactive device of claim 10, wherein the size of the human face on the captured image is used as the measurement parameter.

12. The interactive device of claim 10, further comprising an emitter and a receiver, wherein the emitter and the receiver are used to determine a sensed distance of the human face to the camera by measuring a signal delay between the emitter and the receiver, and the sensed distance is used as the measurement parameter.

13. The interactive device of claim 10, wherein the processor:
   acquires a plurality of images and analyzes only moving portions of the images to detect the human face.

14. The interactive device of claim 10, further comprising:
   a database containing object definitions;
   wherein the processor compares the acquired image with the objects stored in the database; and
   in case of a positive comparison, displays commands related to the object.

15. The interactive device of claim 14, wherein the object definition is a human face of a particular user, and commands displayed are related with this particular user.

16. The interactive device of claim 14, wherein the processor is configured to record into the database the selections of the particular user to create a selection history, and to propose commands according to the selection history.

17. The interactive device of claim 14, wherein the database with stored faces is built incrementally as new users interact with the device.

18. The interactive device of claim 10, wherein the measurement parameter is selected from the group consisting of a size of the human face and a distance between the sensor and the human face.

19. The man-machine interface method of claim 1, wherein the measurement parameter is selected from the group consisting of a size of the human face and a distance between the sensor and the human face.

* * * * *